(12) United States Patent
Fuchs et al.

(10) Patent No.: US 7,038,221 B2
(45) Date of Patent: May 2, 2006

(54) LUMINOPHORE PLATE

(75) Inventors: Manfred Fuchs, Nürnberg (DE); Erich Hell, Gingen (DE); Detlef Mattern, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 273 days.

(21) Appl. No.: 10/660,385

(22) Filed: Sep. 11, 2003

(65) Prior Publication Data

US 2004/0126489 A1 Jul. 1, 2004

(30) Foreign Application Priority Data

Sep. 11, 2002 (DE) .................... 102 42 006

(51) Int. Cl.
*H05B 33/00* (2006.01)
(52) U.S. Cl. ................................ 250/484.4
(58) Field of Classification Search ........... 250/484.4
See application file for complete search history.

(56) References Cited

U.S. PATENT DOCUMENTS

| | | | |
|---|---|---|---|
| 4,371,806 A | 2/1983 | Bintig et al. | |
| 4,769,549 A * | 9/1988 | Tsuchino et al. | 250/484.4 |
| 4,985,633 A | 1/1991 | Vieux et al. | |
| 6,414,315 B1 * | 7/2002 | Wei et al. | 250/370.11 |

FOREIGN PATENT DOCUMENTS

| | | |
|---|---|---|
| DE | 195 16 450 | 8/1996 |
| DE | 44 33 132 | 2/1999 |
| EP | 0 573 879 | 12/1992 |
| FR | 2 515 423 | 4/1983 |

OTHER PUBLICATIONS

"New Needle-Crystalline CR Detector," Leblans et al, Proc. Of SPIE, vol. 4320 (2001) pp. 59-67.

* cited by examiner

*Primary Examiner*—David Porta
*Assistant Examiner*—Mindy Vu
(74) *Attorney, Agent, or Firm*—Schiff Hardin LLP

(57) ABSTRACT

A luminophore plate has a substrate and an auxiliary layer lying thereabove onto which a storage luminophore layer is applied. The auxiliary layer is rastered such that nubs separated by trenches are formed. Luminophore needles of a storage luminophore are formed on the surface of said nubs by vapor deposition.

25 Claims, 4 Drawing Sheets

LUMINOPHORE PLATE

BACKGROUND OF THE INVENTION

1. Field of the Invention

The present invention is directed to a luminophore plate of the type having a substrate and an auxiliary layer lying thereabove onto which a storage luminophore layer is applied.

2. Description of the Prior Art

X-ray luminophores are generally employed in medical technology and in non-destructive materials inspection. In these applications, scintillators are utilized for spontaneous emission under X-ray stimulation, and storage luminophores are utilized for forming and storing electrons and holes for subsequent photo-stimulated emission (PSL) when irradiated with, for example, red light.

X-ray luminophores on the basis of alkali halides play a very specific role for such purposes. Examples are CSI:Na in X-ray image intensifier, CsI:TI in a-Si detectors and, recently CsBr:Eu as a storage luminophore plate as described, for example, in Proc. SPIE, Vol. 4320 (2001), "New Needle-crystalline CR Detector" by Paul J. R. Leblans et al., pages 59–67.

All of the aforementioned medical applications of alkali halides have in common the fact that the layers are produced by thermal evaporation of the alkali halides (CsBr, CsI) and of the respective dopants (TII, NaI, EuBr2). Dependent on the vapor pressure of the materials, the substances can be evaporated from one or from two evaporator vessels, as described, for example, in German OS 100 61 743 and German PS 195 16 450.

To achieve a needle-shaped layer structure which has the ability to guide light, the vapor depositions disclosed in the above prior art publications usually is implemented at an elevated substrate temperature. The coefficient of thermal expansion of the alkali halides CsI and CsBr that are utilized lies at $4.8 \times 10^{-5}/°$ C. Glass, steel, nickel, titanium, copper and aluminum oxide ceramic can be utilized as substrates, their coefficients of thermal expansion be set forth in the following Table from D'Ans Lax, Taschenbuch für Chemiker und Physiker, Volume 1.

TABLE 1

| Substrate material | Coefficient of thermal expansion |
| --- | --- |
| Glass | $(0.3–0.9) \times 10^{-5}/°$ C. |
| Aluminum | $2.4 \times 10^{-5}/°$ C. |
| Steel | $(1.0–1.8) \times 10^{-5}/°$ C. |
| Nickel | $1.3 \times 10^{-5}/°$ C. |
| Titanium | $0.8 \times 10^{-5}/°$ C. |
| Copper | $1.7 \times 10^{-5}/°$ C. |
| Aluminum oxide | $0.8 \times 10^{-5}/°$ C. |

Shrinkage cracks arise in the luminophore layers when cooling the vapor-deposited substrates due to the lower coefficients of thermal expansion. The frequency of crack occurrence is on the order of magnitude Of 0.5–1.5 mm, as can be seen from FIG. 1 herein that shows a 50-power scanning electron microscope image of a known CsBr:Eu layer. The cracks have a width of up to approximately 10 μm, as can be seen in FIG. 2 that shows a 1000-power scanning electron microscope image of a known CsBr:Eu layer.

As is known, more light is coupled out of a luminophore layer at grain boundaries, gaps and cracks than from the luminophore needles themselves. The corona exposure according to FIG. 3 shows a microscopic illustration of an incident light point of a CsBr:Eu layer with noticeably brighter gaps and a crack that demonstrates this behavior.

The problem area that has been described is especially pronounced for storage luminophore layers such as, for example, CsBr:Eu. In the readout event, the surface of the luminophore layer is thereby scanned with a "red light spot" having a diameter of 50–150 μm. In the case of a glass substrate, however, the scanning also can ensue from the "underside". A non-uniform readout of the stored electron-hole pairs thereby occurs corresponding to the layer structure. FIG. 4 shows the frequency-dependent quantum efficiency (DQE) of a storage luminophore layer. The "unnatural" course of the DQE curve from high to low spatial frequencies can be clearly recognized. A "forced" plateau is present in the region around 1 LP/mm. This effect is even noticeably intensified given a higher X-ray dose.

In contrast thereto, the light in the luminophore needles is generated by the X-ray quanta in the luminophore layers such as, for example, CsI:Na or CsI:Tl. The effect of a layer structure is not as problematical, especially when no photocathode is present on the luminophore needles—as in the case of an X-ray image intensifier.

In context of the aforementioned prior art, attempt has been made to generate many fine gaps around each luminophore needle by admitting gas during the vapor deposition process of the luminophore layers. It has been shown in practice, however, that this hope is achieved only conditionally, as a cathode luminescence exposure of a known CsBr:Eu layer manufactured according to German OS 100 61 743 magnified 250 times, shown in FIG. 5, demonstrates.

Another disadvantage of this evaporation method is that the density of the layer becomes lower the higher the gas pressure is during the vapor deposition. This results in the geometrical layer thickness increasing by approximately 20% for identical X-ray absorption and increased "crosstalk" of light in neighboring regions thus becomes possible. The MTF degradation is exactly as high as given a 20% thicker layer with "normal" density and correspondingly higher X-ray absorption and DQE.

German OS 29 29 745 discloses the manufacture of a luminescent screen with a grid structure. An attempt was made to prescribe the needle size with the grid structure of the substrate material by means of a designational roughening. Each "nub"—original surface of the substrate material—is followed by a "trench", an etched-in depression. This means that mammography applications are practically not possible because of the small structural size that is required. Moreover, the structuring method is highly material-dependent because of different etching solutions, which is unfavorable in terms of fabrication technology and not environmentally compatible.

SUMMARY OF THE INVENTION

An object of the present invention is to eliminate the aforementioned disadvantages of the grid method, so that a mammography application is possible and no material dependency exists.

This object is inventively achieved in a luminophore plate having a substrate covered by an auxiliary layer, that is in turn covered by a storage luminophore layer, wherein the auxiliary layer is rastered such that nubs separated by trenches are formed, and luminophore needles of the storage luminophore are formed on the surface of the nubs by means of vapor deposition. The material-dependency is avoided by rastering not the substrate but an auxiliary layer lying thereabove.

One luminophore needle or a number of separate luminophore needles can be formed on each nub.

It has proven advantageous fir the auxiliary layer to be between 20 and 200 μm thick. It can be inventively composed of a material whose coefficient of thermal expansion lies between $2.5 \times 10^{-5}/°$ C. and $4.7 \times 10^{-5}/°$ C.

Advantageously, the grid dimension (nub with trench) can lie in the range between 10 and 100 μm, preferably 20—50 μm, with the width of the trenches being in the range from 5 to 20 μm.

It has been found to be especially suitable to compose the auxiliary layer of a plastic, for example of polyimide with a coefficient of thermal expansion of $3.1-3.5 \times 10^{-5}/°$ C. or parylene C.

Inventively, the nubs can be arranged in a grid structure that varies over the overall surface.

The nubs and/or their grid structure can be fashioned as n-sided polygons, whereby n can assume a number between three and six.

DESCRIPTION OF THE PREFERRED EMBODIMENTS

Figure 1:
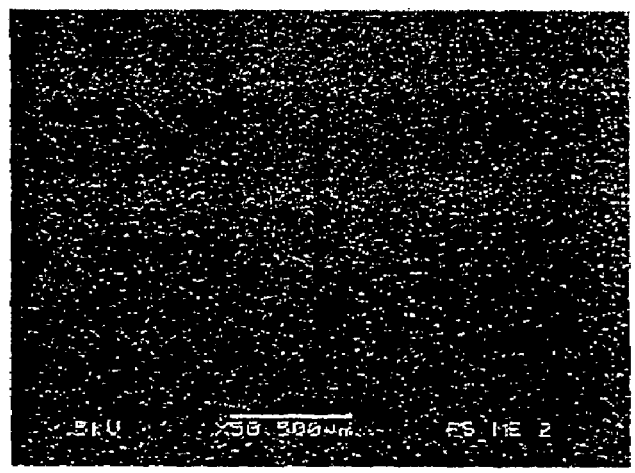
FIG. 1, as described above, is a 50-power scanning electron microscope image of a known CsBr:Eu layer for illustrating the frequency of crack occurrence.
Figure 2:
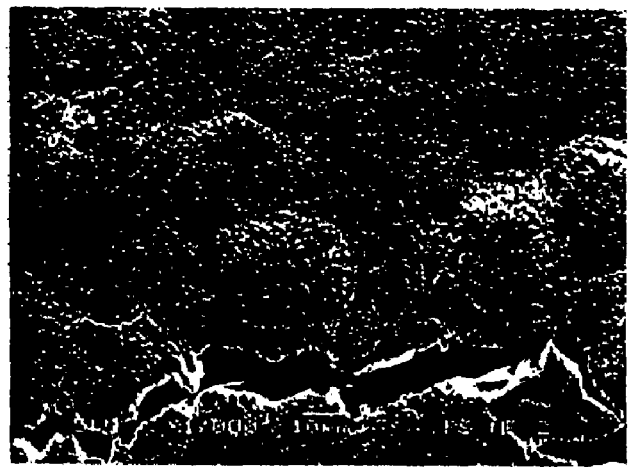
FIG. 2, as described above, is a 1000-power scanning electron microscope image of a known CsBr"Eu layer for illustrating the crack width.
Figure 3:
FIG. 3 is a microscope image of a light well of a known CsBr:Eu layer.
Figure 4:
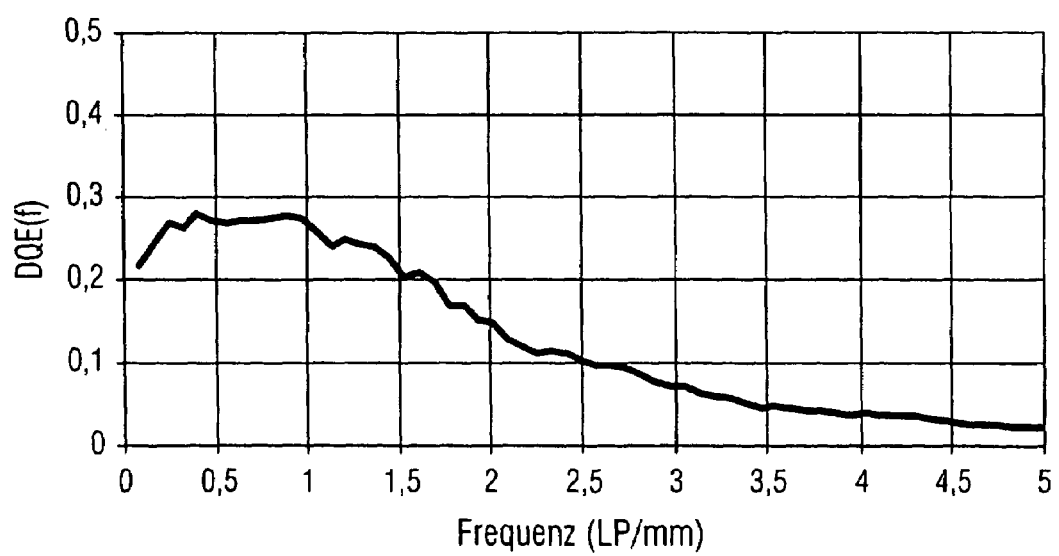
FIG. 4 is a curve of the frequency-dependent DQE of a CsBr:Eu layer with "plateau" through the known structure.
Figure 5:
FIG. 5 is a 250-power cathode luminescence exposure of a known CsBr:Eu layer.
Figure 6:
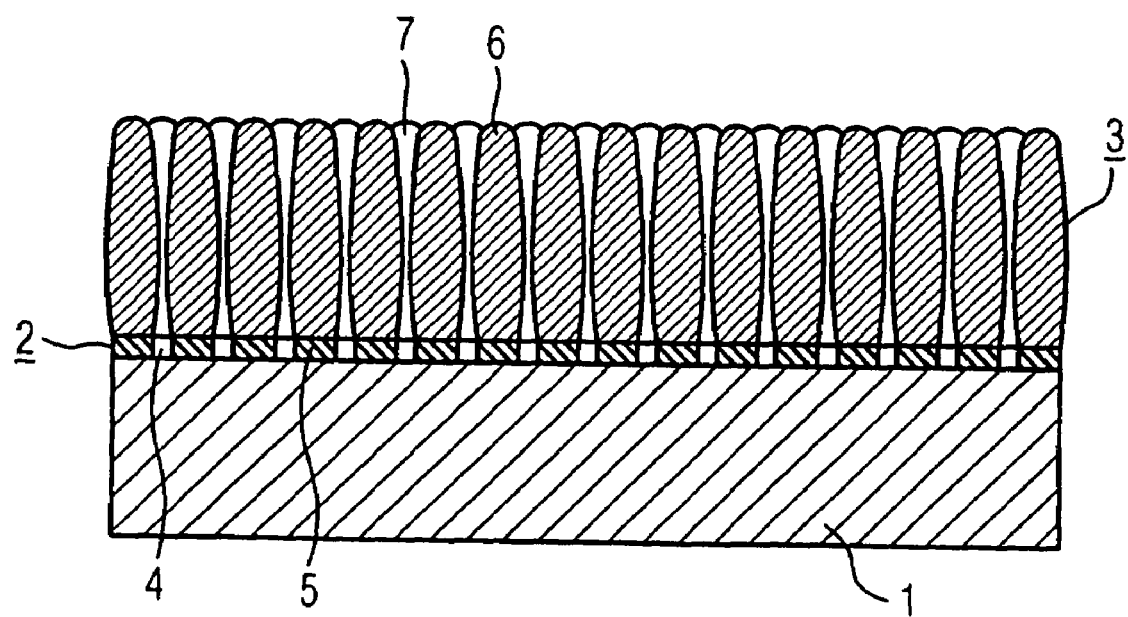
FIG. 6 is a cross-section through a first embodiment of an inventive luminophore plate.

FIG. 6 shows an inventive luminophore plate, for example a storage luminophore plate, that has a substrate 1 of glass or aluminum. In accordance with the invention an auxiliary layer 2 is vapor-deposited onto the substrate 1, and a storage luminophore layer 3 is vapor-deposited on said auxiliary layer 2, and the auxiliary layer 2 is rastered such that nubs 5 separated by trenches 4 and formed. Due to the vapor-deposition of the storage luminophore onto the substrate structured by this auxiliary layer 2, individual, needle-shaped crystals of the storage luminophore, referred to as luminophore needles 6, respectively form on the nubs 5, with the nubs functioning as "seeds," the said needles 6 being separated by interstices 7.

Figure 7:
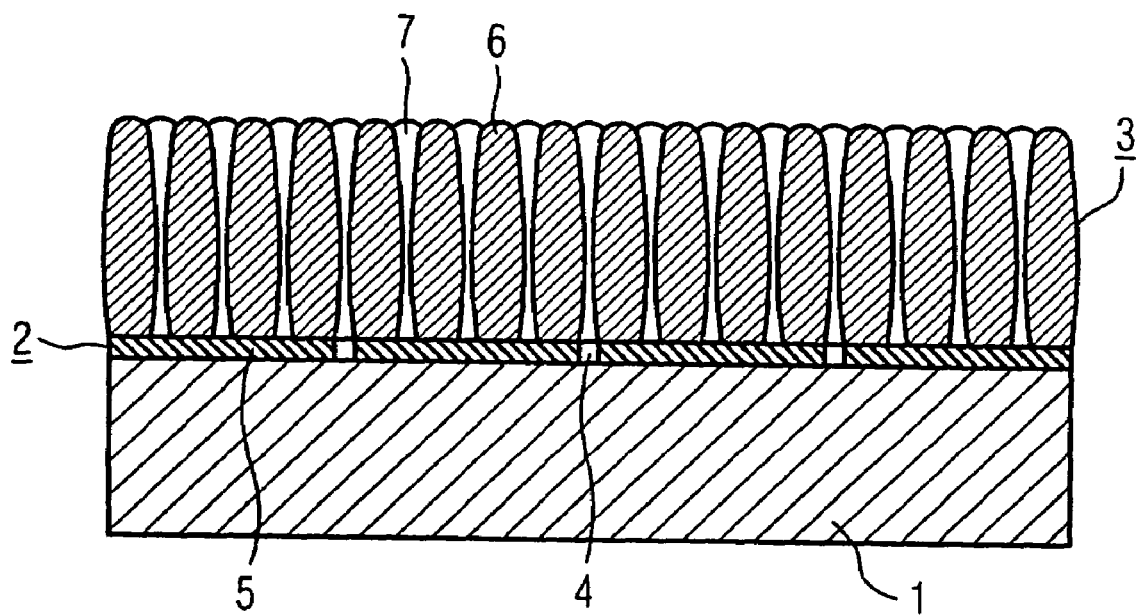
FIG. 7 is a cross-section through a second embodiment of an inventive luminophore plate.

FIG. 7 shows a further embodiment of the inventive storage luminophore plate that has essentially the same structure as the embodiment of FIG. 6 but exhibits a larger intermediate layer grid given the same needle size. A number of separate luminophore needles 6 are formed here on each of the nubs 5 by selecting the coefficients of thermal expansion and the vapor-deposition conditions.

The auxiliary layer 2 must be between 20 and 100 μm thick and should be composed of a material with a coefficient of thermal expansion between $2.5 \times 10^{-5}/°$ C. and $4.7 \times 10^{-5}/°$ C. Advantageously, the auxiliary layer 2 is composed of a plastic, particularly parylene C or a polyimide layer having a coefficient of thermal expansion of $3.1-3.5 \times 10^{-5}/°$ C. The structuring with various patterns, for example quadratic or hexagonal, can be implemented with the currently available methods, for example photolithography/etching, electron beam, laser beam or ion beam vaporization. However, the nubs 5 and/or their structure can also exhibit other shapes. They can also be triangular, pentagonal or polygonal. The given structure can also vary over the surface.

The grid dimension generated in this way, i.e. the distance from one nub 5 with a trench 4 to the next, should lie between 10 and 100 μm, particularly 20–50 μm. The width of the trench 4 should amount to between 5 and 20 μm.

The selection of a suitable auxiliary layer 2—because of the expansion—results in the CsBr layer shrinking more relative to the "structure layer" 2 and the "structure layer" 2 shrinks more greatly relative to the substrate 1 when cooling the storage luminophore layer 3 after the vapor deposition. For the first described cooling process, this results in that the luminophore needles 6 can be separated from one another when a number of the luminophore needles 6 are located on the structured auxiliary layer 2. In the second described case, a gap or interstice 7 can form around each nub 5. The shrinking process is two-stage; the formation of non-uniformly coarse cracks, as is the case in the plate and manufacturing method disclosed in German OS 29 29 745, fails to occur.

A fine structure within the nubs 5 that is suitable for mammography can be achieved when the vapor deposition is implemented at elevated gas pressure, as disclosed in German OS 100 61 743. The elevated gas pressure can be achieved either by means of gas admission or by employing a pump system with a correspondingly high final pressure. It has been shown in the experiments that it is beneficial to implement the vapor deposition at a gas pressure markedly below 1 Pa—contrary to the details in German OS 100 61 743. Moreover, the undesired "artificial" increase in layer thickness can be alleviated and no cracks in the CsBr layer can then be detected transversely across the nubs of the substrate. The cracks only occur when the layer morphology is too "loose", i.e. the vapor deposition was implemented at high gas pressure (>1 Pa).

A colorant solution can be uniformly introduced into the interstices 7 over the entire layer surface in the finely structured storage luminophore layer 3 that has now been obtained. The colorant should have the complementary color of the light wavelength that defines the resolution. Blue for the red stimulation light in the case of the CsBr:Eu storage luminophore and red for the blue emission light in the case of the CsI:Na scintillator. The solvent for the colorant must not dissolve the alkali halide that is employed. This method of introducing a colorant into the interstices 7 of the storage luminophore is disclosed in German PS 44 33 132 but could not be implemented in practice because a homogeneous drive-in of the colorant solution was not possible due to the cracks.

By selecting a suitably structured auxiliary layer 2 on a substrate 1, a luminophore layer or storage luminophore layer 3 can be structured as desired coarsely as well as finely under suitable parameters (pressure, substrate temperature) during cooling after the vapor deposition.

Only a few exemplary embodiments for manufacturing the inventive luminophore plate are described below among all of the possible combinations of substrate, auxiliary layer and the vapor deposition of the luminophore layer:

a) CsBr:Eu—vapor deposition at 0.5 Pa and a substrate temperature of 150° C. on an aluminum substrate structured with parylene C (40 μm nubs with 10 μm trenches).

CsBr layer thickness 500 μm.

b) CsBr:Eu—vapor deposition at 0.ooo5 Pa and a substrate temperature of 300° C. on a glass substrate structured with parylene C (10 μm nubs with 10 μm trenches).

CsBr layer thickness 100 μm c) CsBr:Eu—vapor deposition at 0.9 Pa and a substrate temperature of 200° C. on an aluminum substrate structured by parylene C (30 μm nubs with 5 μm trenches).

CsBr layer thickness 300μ d) CsBr:Eu—vapor deposition at 0.1 Pa and a substrate temperature of 250° C. onto an aluminum substrate structured with polyimide Pyralin PI 2611 (40 μm nubs with 10 μm trenches)

CsBr layer thickness 500 μm e) CsBr:Eu—vapor deposition at 0.01 Pa and a substrate temperature of 180° C. onto a glass substrate structured with polyimide Pyralin PI 2611 35 μm nubs with 10 μm trenches.

CsBr layer thickness 100 μm f) CsBr:Eu—vapor deposition at 0.8 Pa and a substrate temperature of 220° C. onto an aluminum substrate structured with polyimide Pyralin PI 2611 (25 μm nubs with 5 μm trenches.

CsI:Tl or CsI:Na can be utilized instead of CsBr:Eu. The materials listed in Table 1 can be utilized as substrate materials. The pressure can lie between 0.0005 and 0.9 Pa. The substrate temperature should amount to between 150 and 300° C.

The CsBr:Eu layers can be subsequently colored with a solution, for example an ethanol or isopropanol solution of a "GEHA felt pen No. 204, blue". A solution designated "Marker edding 300, col 002, red" is suitable for the CsBr:Na layers. An anhydrous state must be achieved and a drying agent should be utilized as needed.

The invention results in a luminophore plate with a substrate and an auxiliary layer lying thereabove onto which the storage luminophore layer is applied, wherein disturbing cracks in the luminophore layers are reduced by means of substrate structuring for increasing the quantum efficiency (DQE), particularly of storage luminophore layers.

Although modifications and changes may be suggested by those skilled in the art, it is the intention of the inventors to embody within the patent warranted hereon all changes and modifications as reasonably and properly come within the scope of their contribution to the art.

We claim:

1. A luminophore plate comprising:
   a substrate;
   an auxiliary layer disposed on said substrate, said auxiliary layer having a thickness in a range between 20 and 100 μm and being rastered to form a plurality of alternating nubs and trenches; and
   a storage luminophore layer applied on said auxiliary layer, said storage luminophore layer comprising luminophore needles of a storage luminophore formed on the respective nubs of said auxiliary layer by vapor deposition.

2. A luminophore plate as claimed in claim 1 wherein each of said nubs has a plurality of said luminophore needles formed thereon.

3. A luminophore plate as claimed in claim 1 wherein said auxiliary layer is rastered with a grid dimension defined by said nubs and trenches in a range between 10 and 100 μm.

4. A luminophore plate as claimed in claim 3 wherein each of said trenches has a width in range between 2 and 20 μm.

5. A luminophore plate as claimed in claim 1 wherein said auxiliary layer is composed of a plastic.

6. A luminophore plate as claimed in claim 1 wherein said auxiliary layer is composed of parylene C.

7. A luminophore plate as claimed in claim 1 wherein said auxiliary layer is rastered with a grid structure formed by said nubs and trenches that varies over a surface of said auxiliary layer onto which said storage luminophore layer is applied.

8. A luminophore plate as claimed in claim 1 wherein each of said nubs has a shape of an n-sided polygon.

9. A luminophore plate as claimed in claim 8 wherein n is between 3 and 6.

10. A luminophore plate as claimed in claim 1 wherein said auxiliary layer is rastered with a grid structure of said nubs and trenches formed by a plurality of n-sided polygons.

11. A luminophore plate as claimed in claim 10 wherein n is between 3 and 6.

12. A luminophore plate as claimed in claim 1 wherein each of said nubs has a shape of an n-sided polygon and wherein said auxiliary layer is rastered in a grid structure of said nubs and trenches formed by a plurality of n-sided polygons.

13. A luminophore plate as claimed in claim 12 wherein n is between 3 and 6.

14. A luminophore plate comprising:
    a substrate;
    an auxiliary layer disposed on said substrate, said auxiliary layer being rastered to form a plurality of alternating nubs and trenches;
    a storage luminophore layer applied on said auxiliary layer, said storage luminophore layer comprising luminophore needles of a storage luminophore formed on the respective nubs of said auxiliary layer by vapor deposition; and
    said auxiliary layer being composed of material having a coefficient of thermal expansion in a range between $2.5 \times 10^{-5}/°$ C. and $4.7 \times 10^{-5}/°$ C.

15. A luminophore plate comprising:
    a substrate;
    an auxiliary layer disposed on said substrate, said auxiliary layer being rastered to form a plurality of alternating nubs and trenches;
    a storage luminophore layer applied on said auxiliary layer, said storage luminophore layer comprising luminophore needles of a storage luminophore formed on the respective flubs of said auxiliary layer by vapor deposition; and
    said auxiliary layer being composed of a polymide having a coefficient of thermal expansion in a range between $3.1 \times 10^{-5}/°$ C. and $3.5 \times 10^{-5}/°$ C.

16. A method for manufacturing a luminophore plate comprising the steps of:
    disposing an auxiliary layer on a substrate, said auxiliary layer having an upper surface facing away from said substrate;
    rastering said upper surface of said auxiliary layer by forming a plurality of alternating flubs and trenches at said upper surface of said auxiliary layer, with a grid dimension of said nubs and trenches in a range between 20 and 50μ; and
    applying a storage luminophore layer onto said upper surface of said auxiliary layer by vapor depositing luminophore needles of a storage luminophore on each of said nubs.

17. A method as claimed in claim 16 comprising vapor depositing a plurality of said luminophore needles on each of said nubs.

18. A method as claimed in claim 16 comprising forming each of said trenches with a width in a range between 2 and 20 μm.

19. A method as claimed in claim 16 comprising rastering said auxiliary layer with grid structure that varies over said upper surface of said auxiliary layer.

20. A method as claimed in claim 16 comprising forming of said nubs as n-sided polygon.

21. A method as claimed in claim 20 wherein n is between 3 and 6.

22. A method as claimed in claim 16 comprising rastering said upper surface of said auxiliary layer with a raster structure comprising a plurality of n-sided polygons.

23. A method as claimed in claim 22 wherein n is between 3 and 6.

24. A method as claimed in claim 16 comprising forming of each of said nubs as an n-sided polygon, and rastering said upper surface of said auxiliary layer with a raster structure comprising a plurality of n-sided polygons.

25. A method as claimed in claim 24 wherein n is between 3 and 6.

* * * * *